United States Patent [19]

Mott

[11] Patent Number: 4,650,445
[45] Date of Patent: Mar. 17, 1987

[54] CHAIN-BELT

[75] Inventor: Philip J. Mott, Des Plaines, Ill.

[73] Assignee: Borg-Warner Automotive, Inc., Troy, Mich.

[21] Appl. No.: 703,359

[22] Filed: Feb. 20, 1985

[51] Int. Cl.⁴ .............................................. F16G 13/08
[52] U.S. Cl. ..................................... 474/201; 474/242
[58] Field of Search ............... 474/201, 238, 240, 241, 474/242, 244, 245, 215

[56] References Cited

U.S. PATENT DOCUMENTS

| 754,238 | 3/1904 | Reeves | 474/245 |
|---|---|---|---|
| 989,719 | 4/1911 | Morse | 474/215 |
| 1,465,946 | 8/1923 | Muller | 474/215 |
| 1,570,274 | 1/1926 | Muller | 474/213 |
| 1,868,334 | 7/1932 | Morse | 474/216 |
| 1,974,338 | 9/1934 | McCann | 474/214 |
| 2,667,791 | 2/1954 | Bremer | 474/214 |
| 3,016,755 | 1/1962 | Dittrich | 474/242 X |
| 3,049,933 | 8/1962 | Besel | 474/201 X |
| 3,720,113 | 3/1973 | Van Doorne et al. | 474/242 |
| 3,916,709 | 11/1975 | Steuer et al. | 474/242 |
| 4,313,730 | 2/1982 | Cole, Jr. et al. | 474/201 |
| 4,344,761 | 8/1982 | Steuer | 474/245 |
| 4,464,152 | 8/1984 | Kern | 474/245 |
| 4,507,106 | 3/1985 | Cole, Jr. | 474/215 |
| 4,512,754 | 4/1985 | Cole, Jr. et al. | 474/245 |

Primary Examiner—Stephen J. Novosad
Assistant Examiner—Thuy M. Bui
Attorney, Agent, or Firm—James A. Geppert

[57] ABSTRACT

A power transmission chain extending between driving and driven means, such as pulleys or sprockets to transfer torque wherein the chain is formed of a plurality of links having a substantially constant pitch and a plurality of serially arranged contact surfaces engaging contact surfaces of the driving and driven means. The links are designed with longitudinally spaced apertures providing centers of action that are located with respect to a reference line of the link to vary the chordal action of at least some of the links to alter the contact timing and duration between the chain and the driving and driven means to change the generated noise pattern.

38 Claims, 22 Drawing Figures

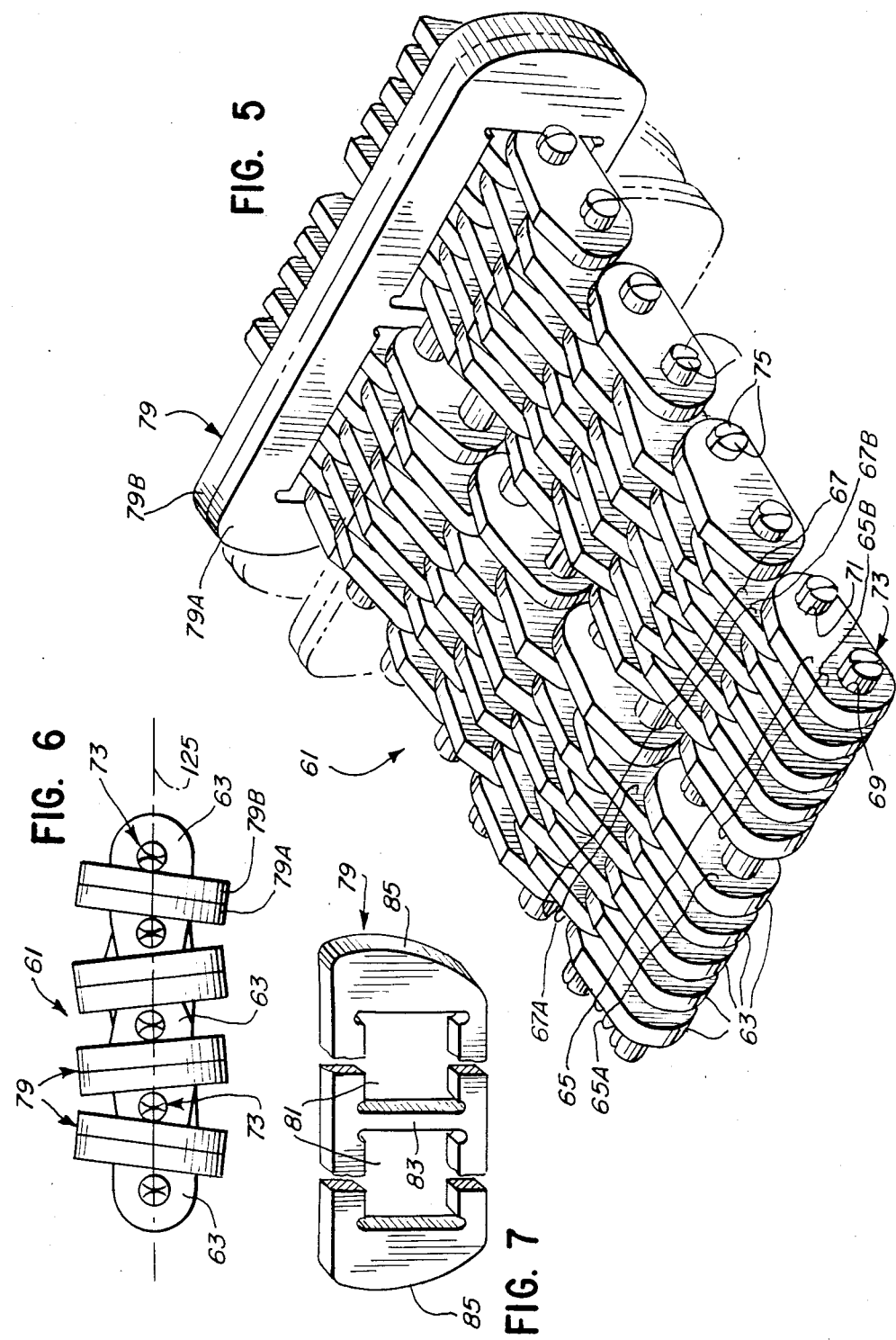

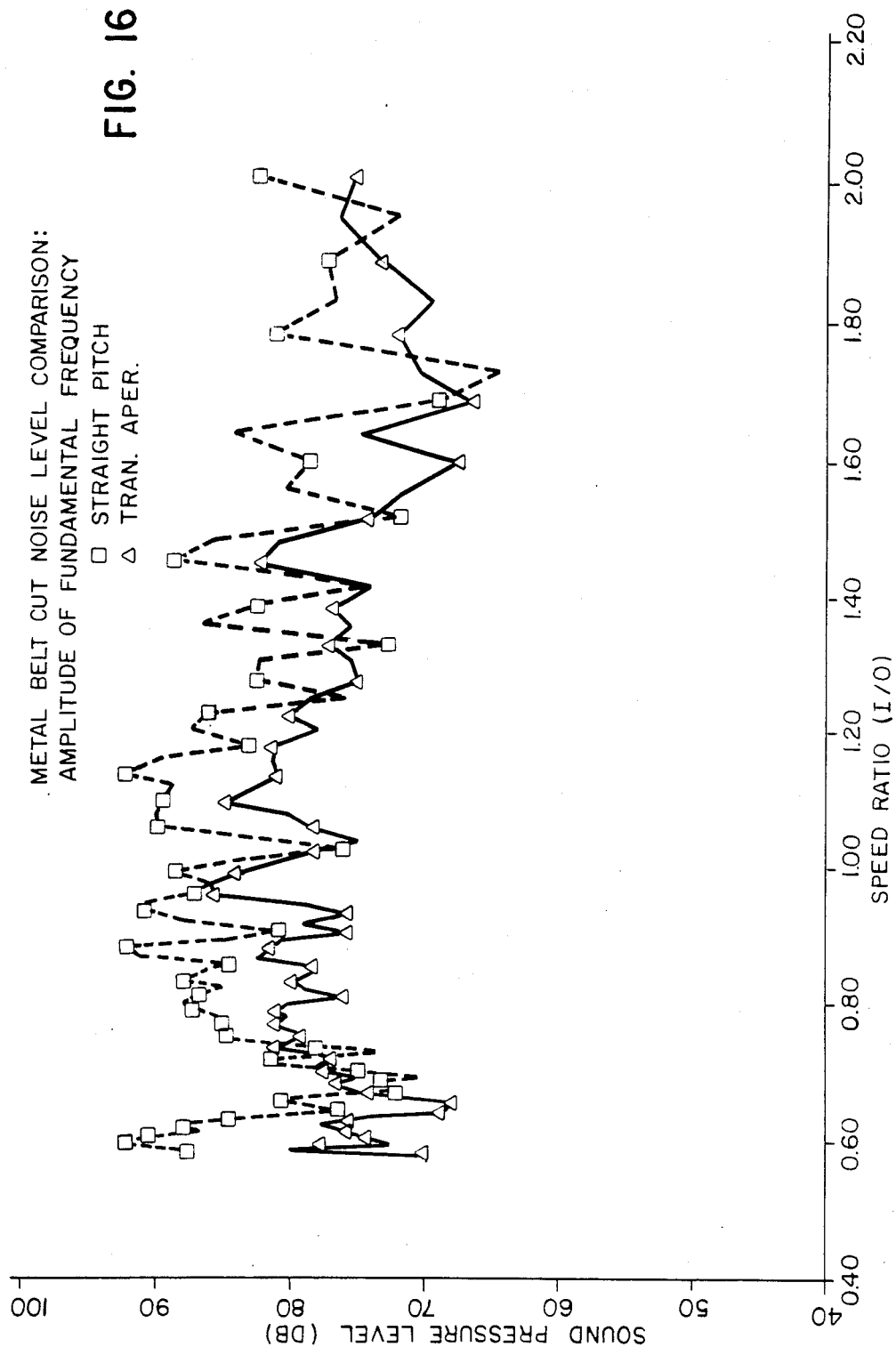

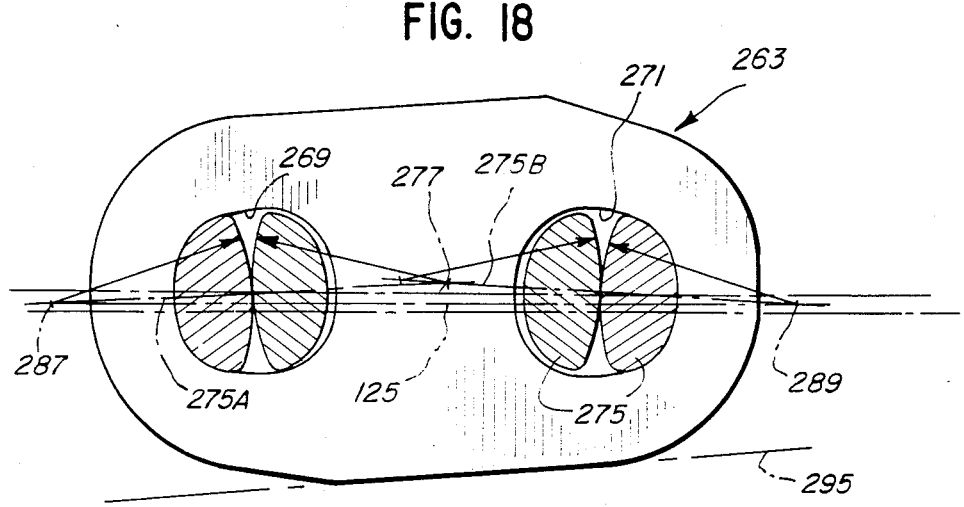
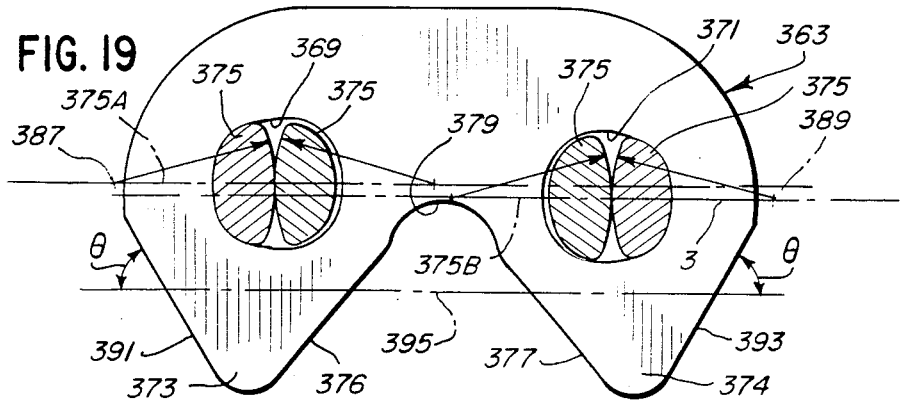
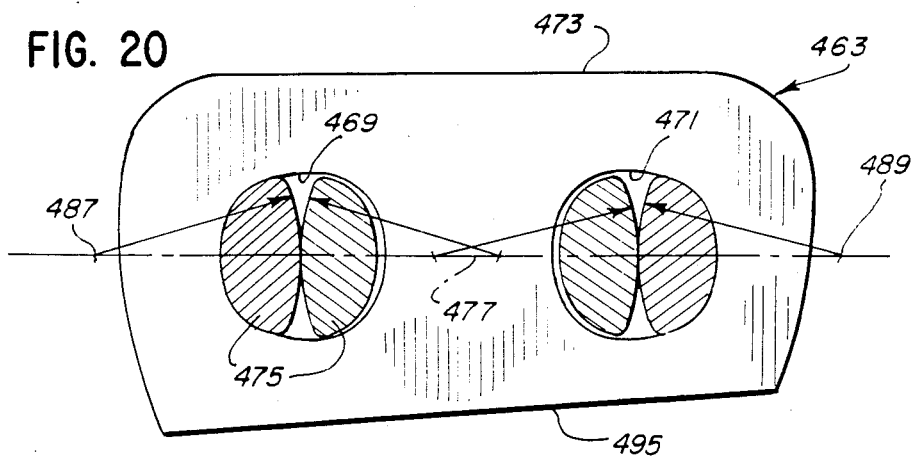

CHAIN-BELT

BACKGROUND OF THE INVENTION

Variable pulley transmissions for transferring torque from an input or drive shaft to an output or driven shaft have been used for some time. In these transmissions, a first pulley constructed of a pair of flanges is mounted on the input shaft such that at least one of its flanges is axially movable with respect to its other flange. A second, similarly constructed and adjustable pulley is mounted on the output shaft. A flexible belt connects the two pulleys to transfer torque therebetween when the input shaft is driven. As the effective diameter of one pulley is changed, the effective diameter of the other pulley is simultaneously changed in the opposite direction to adjust the speed ratio between the input and output shafts in a smooth, continuous manner.

Automotive engineers have long recognized that the maximum operating efficiency of the engine could be achieved if the transmission could be controlled by adjusting to different loads and speed ratios, such that the engine is maintained and operated at its maximum efficiency operating conditions. This is not possible when a conventional geared transmission is teamed with an engine as the speed ratio is adjusted in discrete steps, rather than continuously. Accordingly efforts have been directed to the use of a continuously variable transmission (CVT) of the type described above, and have resulted in commercial production of passenger cars in which a flexible, continuous rubber belt is used to drivingly connect the pulleys. Rubber belts are subject to wear by reason of the loads they must handle and operation under severe temperature, vibration and other adverse environmental conditions. To improve belt life, flexible belts of metal have been used and considerable effort is being expended to produce inexpensive and durable metal belts. Many of these metal belts are described in the patent literature.

Flexible metal belts for use with CVTs are generally of two varieties, those referred to as "push" belts and those referred to as "pull" belts. An example of a push belt is described in Van Doorne et al U.S. Pat. No. 3,720,113 and an example of a pull belt is described in Cole, Jr. et al U.S. Pat. No. 4,313,730. The belt shown in U.S. Pat. No. 3,720,113 comprises an endless carrier constructed of a plurality of nested metal bands and an endless array of load blocks longitudinally movable along the carrier. Each block has edge surfaces for engaging the pulley flanges of a pulley transmission to transmit torque between the pulleys. The push belt has been used in passenger cars on a limited basis and for some non-automotive, industrial applications. The pull belt of Cole, Jr. et al utilizes an endless chain as the carrier, the sets of links of which are pivotably connected by pivot means, shown as round pins. Generally trapezoidal (when viewed from the front) load blocks encircle the links; however the load blocks in the pull belt of Cole et al are constrained against longitudinal movement along the chain by the pivot means. The patent literature also describes a belt constructed of metal parts joined by pivot means in which the pivot means engage the pulleys of a CVT.

The push belt as described in relatively expensive to manufacture. The pull belt offers a less expensive alternative to the push belt. There are fewer problems in the manufacture of the belt because the links and load blocks (a single member or an assembly of relatively thin plates) can be stamped from sheet metal and the pivot means can be cut from extruded stock.

Aside from costs, a major concern of automotive engineers is noise generation by drive belts for pulley transmissions. Noise of a mixture of frequencies is less objectionable to humans than noise of pure frequencies. Currently an evaluation used by some automotive engineers is to rate noise generated by drive belts of the type described herein in a generally subjective manner by driving or riding in an automobile in which the belt is installed and listening to the generated noise. The noise is then rated on a numerical scale of 1 to 10 with the higher numbers indicating the less objectionable noise. Belts achieving a rating of about 6 and above are usually acceptable for use in automotive drives, and can be classified as being of commercial quality. Of course such belts must also be durable, so as to have a reasonable operating life.

Various ways have been suggested for constructing belts for use in a CVT which operate in such a manner to generate noise acceptable to humans, and a discussion of some of these ways will be found in the prior art. A description of some of the prior art follows.

In copending application Ser. No. 344,679, filed Feb. 1, 1982, now U.S. Pat. No. 4,464,152, a chain-belt constructed in a manner similar to the Cole et al patent, supra, has sound damping means interleaved with load block laminations.

Copending application Ser. No. 497,479, filed May 23, 1983, now U.S. Pat. No. 4,516,964, discloses load blocks of different transverse widths, all of which contact the pulley flanges, but some at a different radial location on the pulley flanges from others, thus modifying the generated noise pattern.

In copending application, Ser. No. 497,480, filed May 23, 1983, now U.S. Pat. No. 4,516,965, some load blocks do not contact the pulley flanges, or some load blocks are missing or "skipped", to thus modify the generated noise pattern.

Copending application, Ser. No. 497,478, filed May 23, 1983, now U.S. Pat. No. 4,516,963 discloses a random mixture of load block-pulley flange engaging areas to provide a pattern of random engagement thereof with the pulley flanges, and thus a modified generated noise pattern.

A suggested way to modify the generated noise pattern in a chain in which the pivot means drivingly contact the pulley flanges is to provide a drive chain constructed of a mixture of links of different pitches, such as U.S. Pat. No. 4,344,761, issued Aug. 17, 1982.

Morse U.S. Pat. No. 1,868,334, issued July 19, 1923, teaches constructing a chain for use with sprockets which provides a mixture of distances between adjacent centers of articulation or a mixture of "effective pitches" in order to "break up rythmic vibrations that sometimes cause trouble in chain drives". The patent is silent as to whether or not this "trouble" is noise related.

The invention to be described herein relates to chain and chain-belts which are used to connect sprockets or pulleys of power transmissions. The invention finds particular use for connecting the pulleys of a continuously variable transmission, commonly known as a CVT. In the description which follows, reference will be made to chain, it being understood that this includes not only toothed chains, also known as silent chain, but also structures known as chain-belts, which comprise a carrier of connected chain links, pivot means connecting interleaved chain links and drive blocks each of which encircles a set of links. The invention is primarily applicable to that variety of chain-belt known as pull belts.

In its broadest aspect, the chain is an endless loop and comprises a plurality of links, each defining a pair of longitudinally spaced apertures with one aperture in each link being transversely aligned with an aperture in the next adjacent link to thus form transverse rows of aligned apertures. Pivot means are received in each row of aligned apertures and the pivot means define spaced transverse articulation axes which are parallel to one another. The articulation axes for each link set are longitudinally spaced from each other.

When a chain as thus described is used in a CVT, load blocks encircle the links between each pivot means, the load blocks being generally trapezoidal in shape, when viewed from the front, with the opposing side edges adapted to engage the flanges of the pulleys of the transmission.

Preferably, the pivot means used in the chain comprise a pair of pins, each having the same cross-sectional configuration and differing, if at all, in length. If a clip is used for retaining the pivot means in the assembly of links and blocks, the pins can be substantially the same length. The pins as thus described are similar to that described and claimed in copending application, Ser. No. 442,386, filed Nov. 17, 1982, now U.S. Pat. No. 4,507,106 and the disclosure therein is incorporated herein by reference. Basically, the pins each have a first, front rocking surface defined by a large radius and a back or link contact surface defined by a plurality of lesser radii.

In chains of the type herein decribed, the links are arranged as sets. The number of links in a set (and of course the gauge of the metal from which the links are made) determines the ultimate width of the chain. For example, in a narrow chain, it is common to have a 7-8-7 etc. lacing or arrangement with load blocks constructed with a single window encircling each set of links. For a wider chain, a modified load block has been suggested, one with multiple windows, the adjacent windows being separated by a strut. It has been proposed to lace the chain in a 4-5, 5-4, 4-5 etc. pattern. Other lacing arrangements can be used within the purview of the invention.

The inventive concepts disclosed herein can also be applied to chains usable to connect toothed sprockets, and especially to chains known in the art as "silent" chains in which the links are constructed with at least a pair of projecting toes defined by flanks separated by a crotch. At least some of the flanks contact the sprocket teeth. The problem of noise generation is present in the silent chain-sprocket drive arrangement and is subjectively rated in a manner similar to that described above.

DEFINITIONS

When used herein, the below listed terms have the following meaning:

The pivot means—a single member. such as a round pin, or a pair of members, such as a pin and bushing, pin and rocker, or pair of pins, extending through a row of aligned link apertures in two interleaved sets of links, to join the links sets and permit articulation thereof.

link—an elongated member having a pair of longitudinally spaced openings adjacent the opposite ends to receive a pivot means.

articulation axis—an axis of rotation defined by the operation of the pivot means; in a rocker joint, the axis is defined by the contact point between a pin and rocker; and in a round pin or pin and bushing, the axis is the geometric center of the pin.

axis of symmetry—in a rocking joint chain, an axis traversing an aperture or a joint member which divides the pin rocking face into two mirror image portions.

center of action—in a round pin or pin and bushing, the geometric center of the pin and/or bushing; in a rocker joint, the geometric center of the rocking face.

line of pull—a line joining the centers of action in a chain or chain-belt when that part is tensioned.

sets of links—the links which are arranged transversely of one another with their apertures transversely aligned with one another.

joint radius—the distance from the axis of articulation of a link to the center of the pulley or sprocket.

load block—a one piece member or an assembly or laminate of a plurality of thin plates for encircling a set of links and shaped to engage the flanges of the pulleys of a pulley transmission to transfer radial load to the links and circumferential load to the pins.

SUMMARY OF THE INVENTION

In the present invention, the links of a chain belt are of a substantially constant pitch and arranged to insure a mixture of joint radii, so that tensions in the chain are not uniformly cyclical in nature, thus producing a noise pattern more acceptable to humans. As such the noise pattern is not as regular or repetitive as that produced by chains and/or chain belts of prior art constructions.

The present invention comprehends the provision of a novel chain link having a reference line generally parallel to the direction of link motion, wherein the link has a pair of longitudinally spaced centers of action which are unequally spaced from the reference line.

Various theories have been advanced as to the source of and reasons for noise or sound generation when a chain meshes with a sprocket or chain-belt engages the flanges of pulleys of a pulley transmission, and the prior art is replete with discussions of these theories. A way to explain the invention is to relate noise generation to "chordal action". The pitch line of a chain constructed of links and/or sets of links, the adjacent ones of which are joined by pivot means to permit the chain to articulate, on a driving means such as a sprocket or pulley, is polygonal rather than circular. This relationship results in that condition which is described in the prior art as chordal action. Chordal action manifests itself as a radial as well as a longitudinal component or motion in the chain as the chain enters the driving means. A cyclical tension occurs in the free strand beyond that of the mean tension providing the driving force, resulting in fluctuations in the bearing loads of the rotating body, i.e., the driving means. In a conventional chain in which the links are the same and the pitch of the links is the same (such as taught by the prior art), the tensions are uniformly cyclical in nature, so that the noise resulting from the cyclical action manifests itself in generated noise having rhythmic impulses or recognizable pure tones which can be objectionable to humans. The chain of the present invention provides a generated noise pattern that is changed or modified in such a way as to be more acceptable to humans even though the changed or modified noise pattern has the same loudness as the unmodified noise pattern.

Each link of a chain belt is similarly shaped, although the orientation of the links in one set may differ from the orientation of the links in another set. Each link has apertures for a pivot means and each pivot means defines a center of action. The centers of action of the chain are parallel to and spaced from each other with at least one center of action transversely offset from a longitudinal reference line; such that one center of action in a link is "offset" or "translated" when compared to the other center of action in that link. Because of the various orientations of this link, a chain may be constructed in which:

1. all links in the chain are similar to those described herein with differently oriented sets of links arranged either in a predetermined pattern or in a random pattern.

2. all links in the chain are similar to those described herein with some sets of links having one orientation and other sets of links having a different orientation; or 3. all links in the chain are similar to those described herein with all links in every set of links having the same orientation; or 4. at least one set of links in a chain is constructed of links as described herein with the remainder of the links being similar to those taught by the prior art;

In all forms as noted above, all links in a set of links have the same orientation.

Also comprehended by the present invention is the provision of a chain link for a toothed or toed chain for use with sprockets, said link having at least one projecting toe and longitudinally spaced apertures with associated centers of action translated from a longitudinal reference line.

BRIEF DESCRIPTION OF THE DRAWINGS

FIG. 5 is an isometric illustration of a segment of chain-belt for use in a CVT and constructed according to this invention;

FIG. 6 is a side view of the chain-belt of FIG. 5;

FIG. 7 is a perspective view with portions broken away of a load block plate usable in the invention illustrated in FIGS. 5 and 6;

FIG. 16 is a graph indicating the noise level in decibels of a chain-belt constructed according to this invention compared to a conventional straight pitch chain-belt.

FIGS. 17 and 18 are illustrations of additional embodiments of links of the present invention, each showing in section a joint means useable with the embodiment of the links.

FIG. 19 is an illustration of a toothed or toed chain for a sprocket utilizing the concept of the present invention.

FIG. 20 is an elevational view of a fifth embodiment of chain link useable in the practice of the invention.

DETAILED DESCRIPTION

Figure 1:
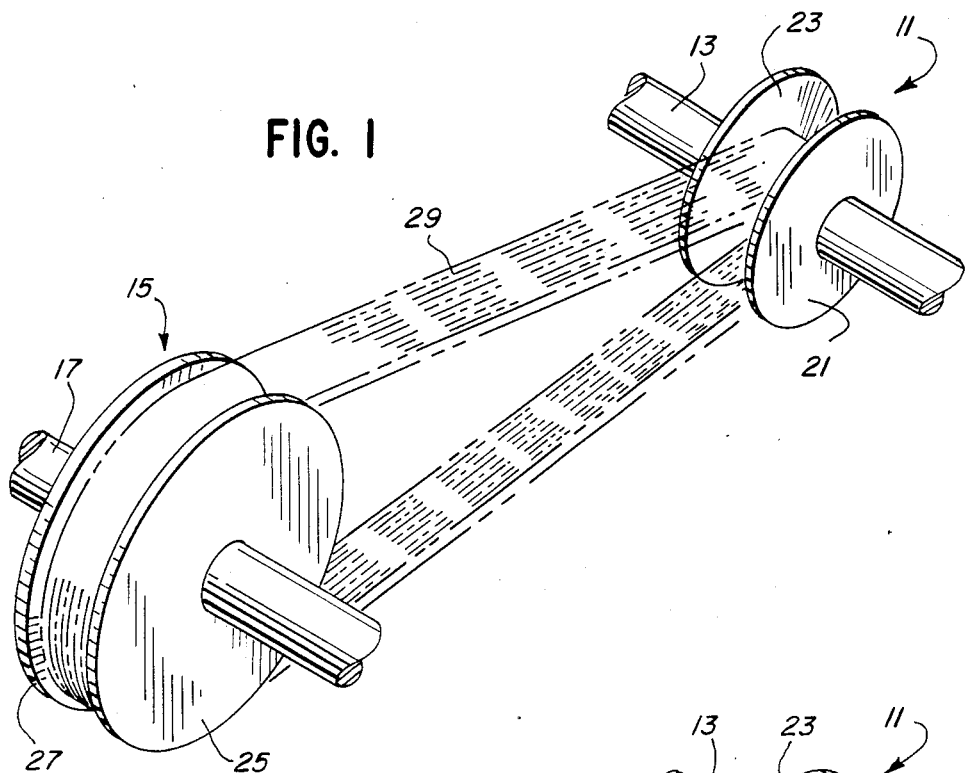
FIGS. 1 and 2 are perspective illustrations of a CVT in the extreme drive ratios.
Figure 2:
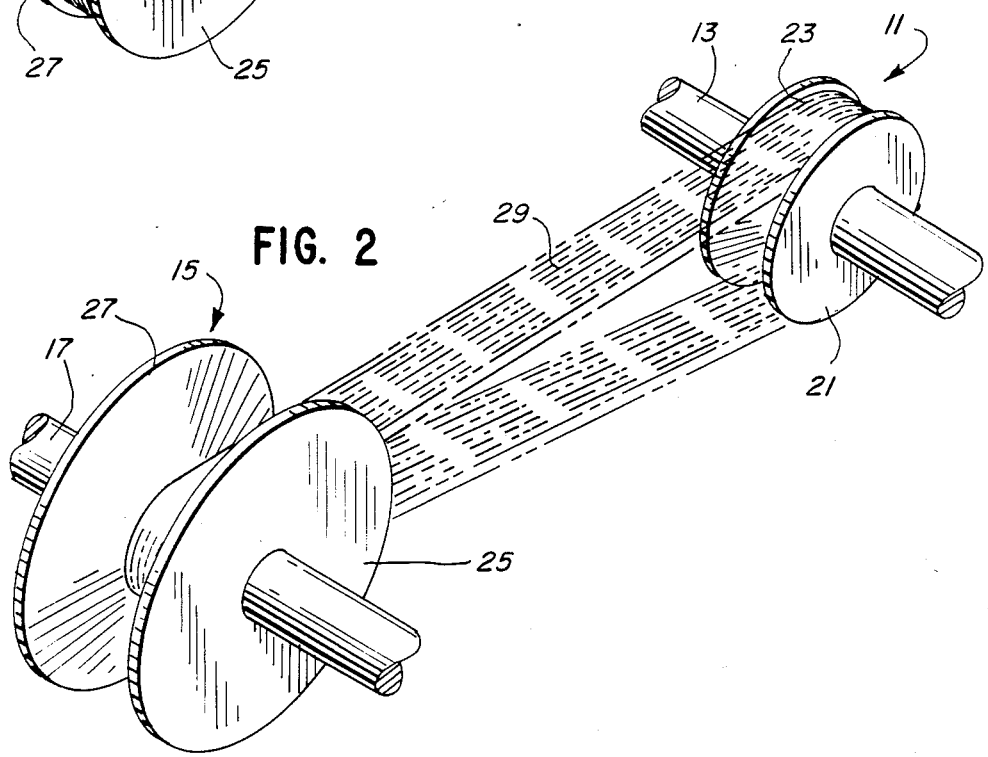

FIGS. 1 and 2 of the drawings illustrate schematically a typical CVT in overdrive and underdrive ratios. The CVT comprises a first pulley 11 connected to a shaft 13 and a second pulley 15 connected to a shaft 17, one shaft being a drive shaft and the other a driven shaft. The pulley 11 comprises flanges 21 and 23 and the pulley 15 comprises flanges 25 and 27. At least one flange of each pulley is axially movable relative to its respective shaft, so as to change the effective diameter of the pulley and vary the drive ratio between the shafts. Generally, mechanical or hydraulic or electrical means, or mixtures thereof, are provided for axially moving one flange of a pulley relative to the other flange of the pulley, but such means are outside the purview of this invention and will not be described. The pulleys are connected by a power transmission belt 29.

Figure 3:
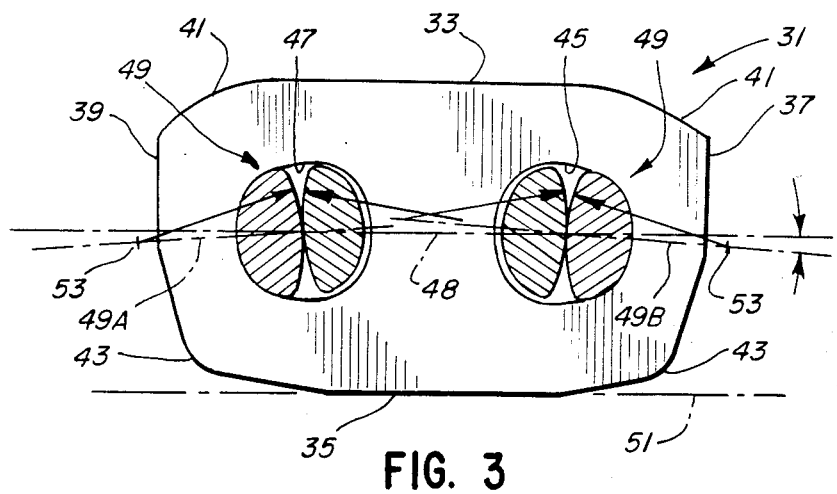
FIG. 3 is an electrical view of a straight pitch link.

FIG. 3 illustrates a straight pitch chain link 31 which may be used in conventional lacing patterns for a drive chain. This link consists of a metal member having substantially parallel longitudinal edges 33 and 35 with shaped end edges 37 and 39 joined by rounded corners 41 and 43. Link 31 includes a pair of longitudinally spaced generally symmetrical apertures 45 and 47 on a center line 48 adapted to receive a suitable pivot means 49, such as a symmetrical pin and rocker shown in FIG. 8, with each aperture having a plane of symmetry 49A and 49B. The planes of symmetry 49A and 49B for apertures 45 and 47 are rotated approximately 3.5° in opposite directions, and a reference line 51 extends longitudinally coincident with the bottom edge 35 of the link. Centers of action 53,53 for the rocking surfaces of the pins 49 are equally spaced from the reference line 51.

Figure 4:
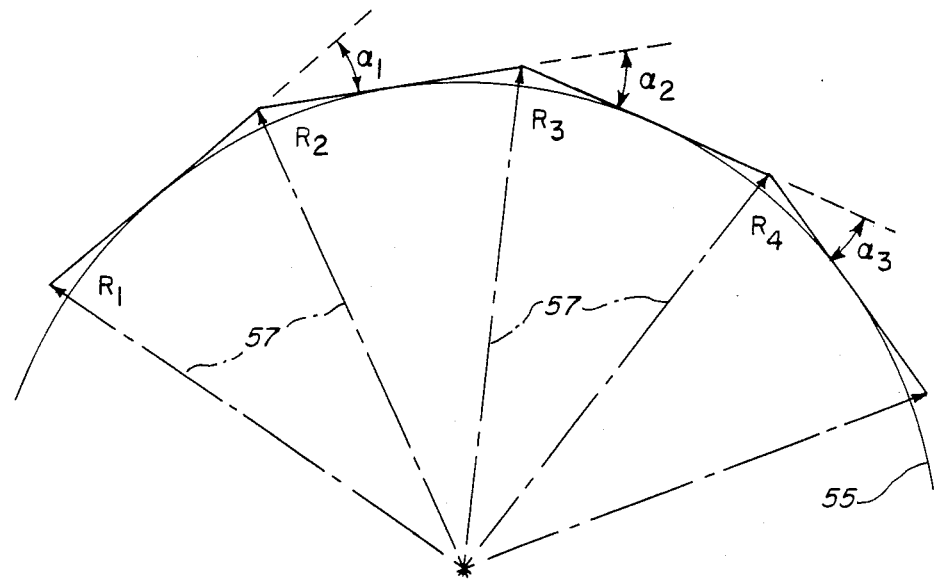
FIG. 4 is a schematic illustration of a straight pitch link chain in engagement with a pulley.

As seen in FIG. 4, a straight pitch chain providing pitch line 55 having suitable load blocks, such a shown in FIG. 7, circumferentially engage a pulley, shown schematically, so that the joint radii 57 of the links are equal in a regular chordal action. Also the articulation angles $a_1$, $a_2$, $a_3$, etc. are equal. Thus, the regular engagement of the straight pitch chain on the pulley generates noise containing rhythmic impulses that are objectionable to humans.

Figure 8:
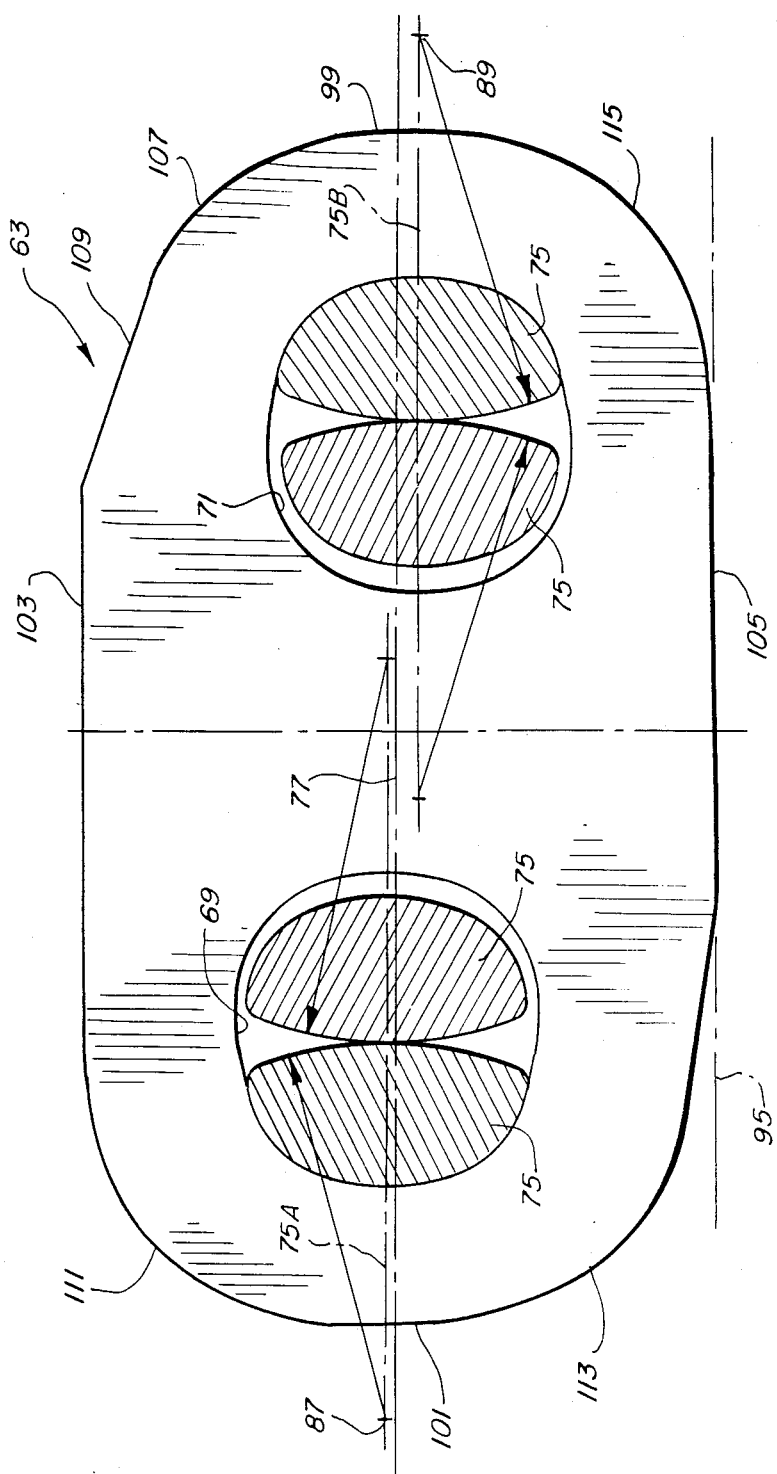
FIG. 8 is an elevational view of a typical link useable in the chain-belt of FIGS. 5 and 6 on an enlarged scale to clearly show various details including the centers of action and showing in section an illustrative pivot means.
Figure 9:
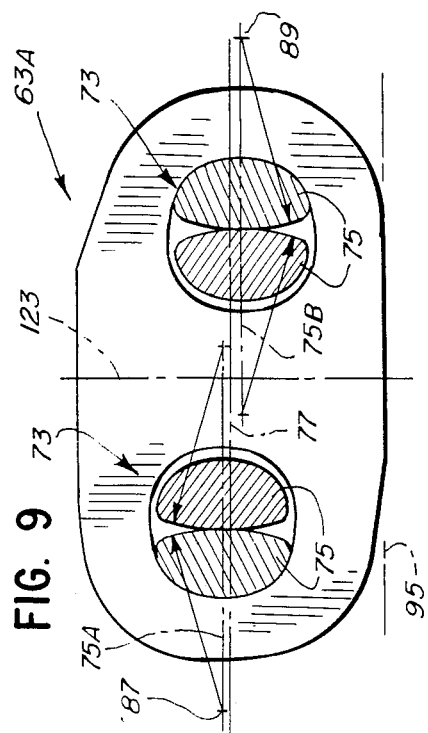
FIGS. 9, 10, 11, and 12 are elevational views of the link for use in the chain-belt of FIGS. 5 and 6 in first, second, third and fourth orientations on one sheet for comparison.
Figure 10:
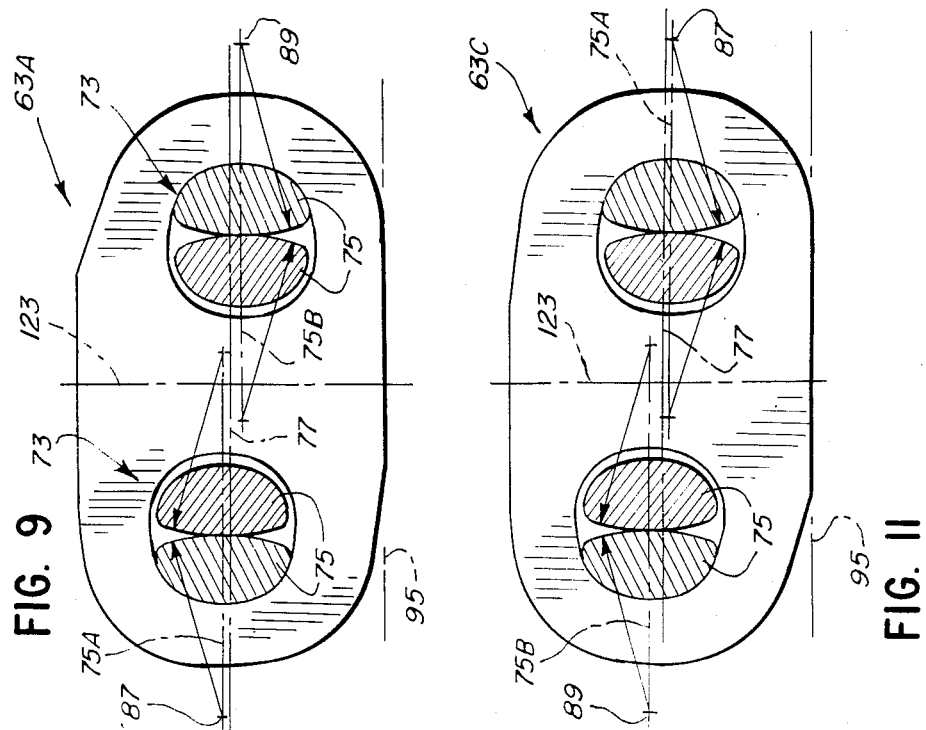
Figure 11:
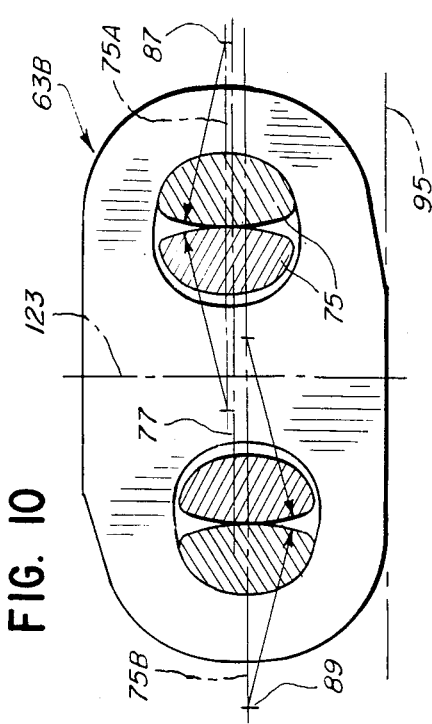
Figure 12:
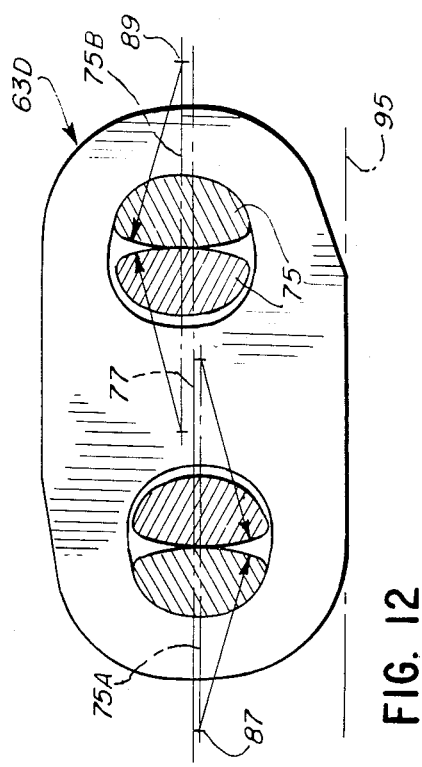

FIGS. 5 and 6 illustrate assembly details of a chain-belt constructed according to this invention. The chain-belt in FIG. 5 (only a segment of a continuous loop with only a few load blocks assembled therewith being shown) is generally identified as 61 and comprises a plurality of links 63 arranged as sets of links 65 and 67 (a typical link 63 is illustrated in FIG. 8 in an enlarged scale and in FIGS. 9, 10, 11 and 12 in various orientations, the links being identified as 63A, 63B, 63C and 63D), each set being interleaved with the next adjacent set. The sets of links are divided into sub-sets 65A, 65B and 67A, 67B. The lacing of the chain 61 is in a 10-8-10-8 pattern, although for narrower chains, a 6-8-6 pattern may be used. Each link 63, (see also FIG. 8) defines a pair of longitudinally spaced symmetrical apertures 69 and 71. The apertures in a set of links are transversely aligned with one another to form rows of apertures and when interleaved, one row of apertures of a set of links is transversely aligned with a row of apertures in the interleaved adjacent set of links. Pivot means 73 received in the aligned apertures joins the interleaved sets of links together and permits articulation of one set of links with respect to the interleaved sets of links. Pivot means 73 are illustrated as rocker joints comprising a pair of symmetrical pins 75. The pins 75 (or pin and rocker) have the same cross-section and the apertures 69,71 have the same profile as described in the aforesaid copending application, Ser. No. 442,386, supra, although circular openings and round pins or pins and bushings could be utilized in this embodiment. In an aperture or group of apertures, pins 75, 75 are identical and, when installed, are reversed relative to each other. Each pin has a bisecting plane of symmetry which is coincident with a bisecting plane of symmetry of the aperture in which the pin is located. The planes of symmetry of the pins 75 in the apertures 69 and 71 are indicated by one dimensional lines 75A and 75B in FIG. 8, and the lines 75A and 75B also represent, in a similar manner, the planes of symmetry of the apertures 69 and 71, respectively.

A load block 79 encompasses each set of links between the next adjacent pivot means 73, and each load block 79 is constructed of one or more plates, illustrated as a pair of plates 79A, 79B, which can be stamped from strip or sheet stock. Load blocks 79 are generally trapezoidal in shape when viewed from the front and each defines a pair of windows 81, each window encircling a sub-set of links, with the windows 81 separated by a central strut 83 joining the top and bottom of the block. The blocks have opposed edges 85 adapted to engage the flanges of the pulleys in a CVT, and may be of a configuration such as shown in U.S. Pat. No. 4,313,730 or copending application, Ser. No. 656,282, filed Oct. 1, 1984. It is to be understood that a complete chain-belt 61 comprises a continuous loop of joined sets of links constituting a tension member with a load block encircling each of the sets of links.

Each link 63, (see especially FIGS. 8 to 12) defines a pair of longitudinally spaced apertures 69, 71 at least one of which is spaced from the longitudinal center line 77 of the link, each receiving pivot means 73 comprising a pair of pins 75, 75. Each pair of pins defines a center of action 87 or 89, as the case may be. The centers of action are perpendicular to the plane of the drawing. Each center of action, in the embodiment being described, lies in the plane of symmetry represented by line 75A or 75B of an aperture and the pivot means therein. The planes represented by lines 75A and 75B are also parallel to a longitudinal plane represented by reference line 95, see especially FIGS. 8 to 12, coinciding with the lower edge of the link. Lines 75A and 75B are parallel and spaced from each other, and in the embodiment being described, along with the centers of action are spaced unequal distances from reference line 95.

Each link 63 in a set 65 or 67 of links has the same orientation, but each set can be composed of links oriented in a different way than the links in other sets. Four such link orientations are illustrated in FIGS. 9 to 12. Chains can be composed of conventional links i.e., those links in which the planes of symmetry of the apparatus and the pins therein coincide, and at least one set of links constructed as described herein, or in a mixture of sets of links, each set having a certain orientation. If constructed of sets each of differently oriented links, the sets of links can be connected in a random pattern or a predetermined pattern to form a complete chain of substantially constant pitch.

In this embodiment, the chain-belt 61 is constructed with all links similar in shape to link 63, which can be oriented in four different ways, see FIGS. 9, 10, 11 and 12, identified as 63A, 63B, 63C and 63D. Each link comprises shaped longitudinally spaced end surfaces 99 and 101, and generally straight spaced longitudinal edge surfaces 103 and 105, which are substantially parallel to one another and generally perpendicular to surfaces 99 and 101, the reference line 95 coinciding with edge 105. Surface 99 is joined to surface 103 by a curved surface 107 and an angled surface 109, the latter serving as an indicator of the orientation of the links in a set (see FIGS. 5 and 8). Curved surface 111 joins surfaces 101 and 103 while curved surfaces 113 and 115 join surfaces 101 and 99, respectively, to surface 105. The curves surfaces 107, 111, 113, and 115 permit the chain-belt with the load blocks assembled thereon to articulate and engage the circumference of the pulleys of the pulley transmission. The end surfaces 99 and 101 may be flat and generally parallel to one another, so that they can abut other end surfaces during the assembly of the chain-belt; otherwise the end surfaces could be curved, if so desired. The surfaces 103 and 105 of the links 63 are generally parallel to the plane represented by reference line 95 which is also parallel to the planes represented by lines 75A and 75B. While a particular outside configuration of the links has been described, it is to be understood that important features of the invention are not completely dependent on this particular configuration; thus other outside configurations could be used without departing from the spirit of the invention.

With reference to FIGS. 8 to 12, planes represented by lines 75A and 75B are parallel to the plane represented by reference line 95 and pass through the centers of action 87 and 89, respectively. Each center of action is spaced a different distance from the plane represented by line 95 and, likewise, from the edge 105 of each link. Thus, the links may be said to have "translated" or "offset" apertures. While the planes 75A and 75B are offset in different directions from the center line 77 of the link, it should be understood that only one plane (75A or 75B) need be so offset from the center line 77 to achieve the results of this invention. An imaginary line 123 perpendicular to the line 95 and also to the planes 75A, 75B is essentially the vertical centerline of a load block of the chain-belt as constructed in accordance with the teachings herein. This is clearly shown in FIG. 13.

Figure 13:
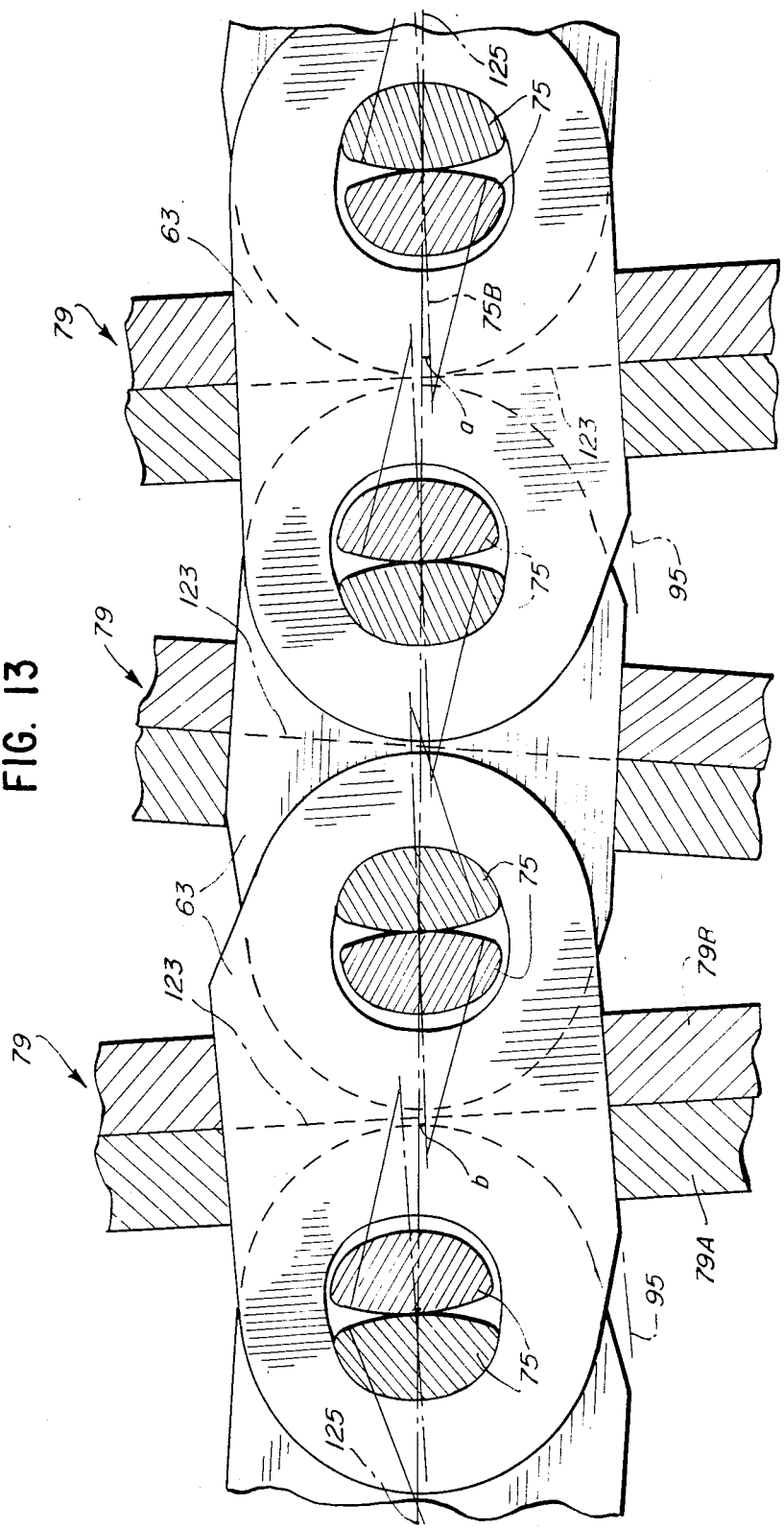
FIG. 13 is an elevational view of a segment of a chain-belt of this invention illustrating the relationship of links and load blocks to the line of pull.
Figure 14:
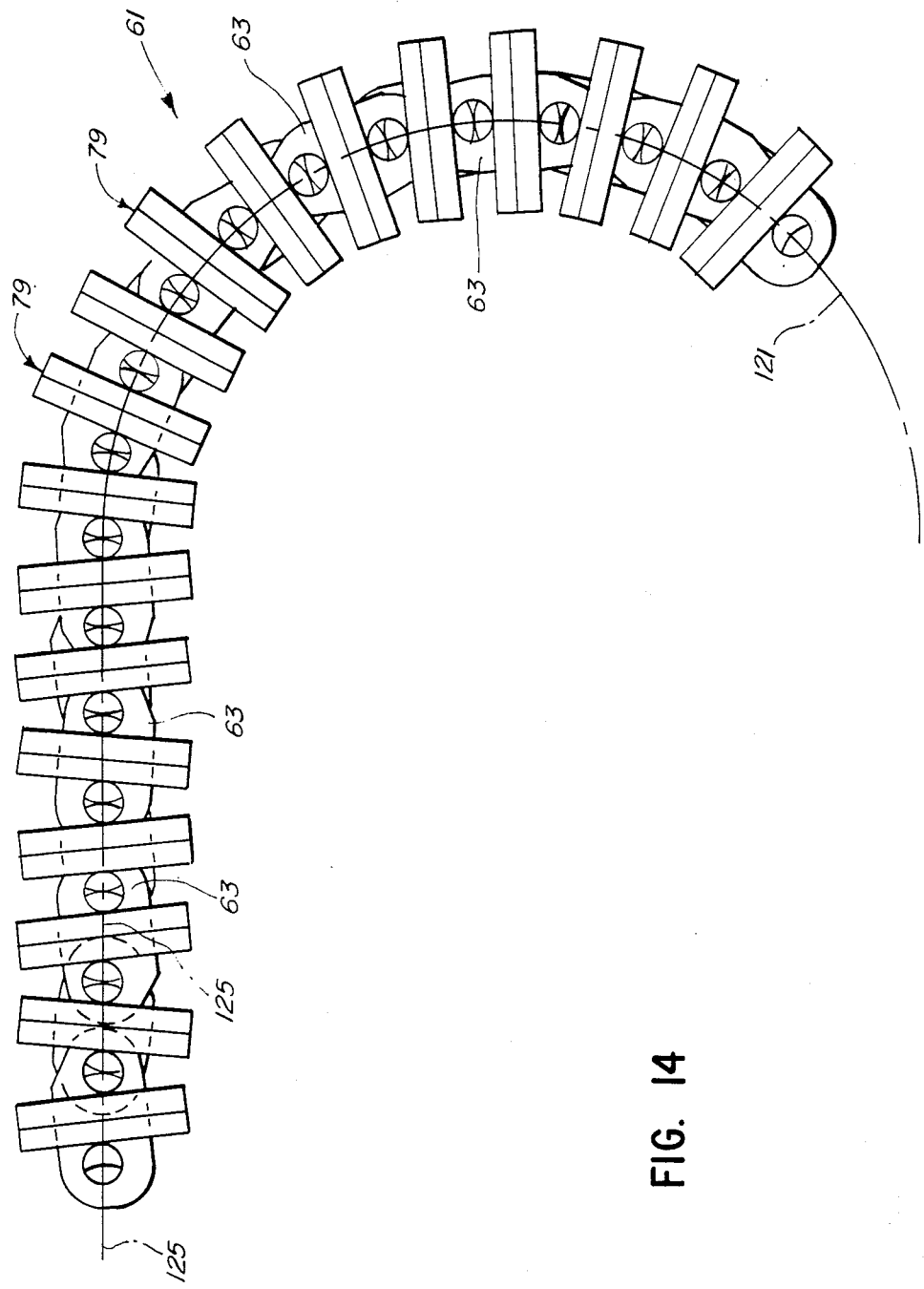
FIG. 14 is an elevational view of a portion of the drive chain schematically showing engagement with a pulley.

Looking now at FIGS. 13 and 14, a segment 61 of chain constructed of sets of links 63 having differently oriented links is shown with the load blocks 79 engaging a sheave 121. When a chain is tensioned (and it is assumed that the chain or at least a segment thereof is essentially longitudinal), a straight line 125 joining the centers of action 87,89 represents the "line of pull". The line of pull is also identified in FIG. 6. Planes represented by lines 75A, 75B and 95 (see FIG. 13) define acute angles with the line of pull. The acute angle thus defined may be positive or negative (an angle is defined as the amount of rotation, in a fixed plane, by which a straight line may be changed from one direction to any other direction). If the rotation is counterclockwise, the angle is said to be positive; if the rotation is clockwise, the angle is said to be negative. As clearly shown in the drawings, (FIG. 14 as well as in FIGS. 5 and 6), each load block is essentially perpendicular to the edge surfaces 103 and 105 of the links encircled thereby and thus the angular disposition of the load blocks 79 to the line of pull is varied either by a positive angle "a" or a negative angle "b" depending upon the orientation of the links which are joined to form the chain.

Figure 15:
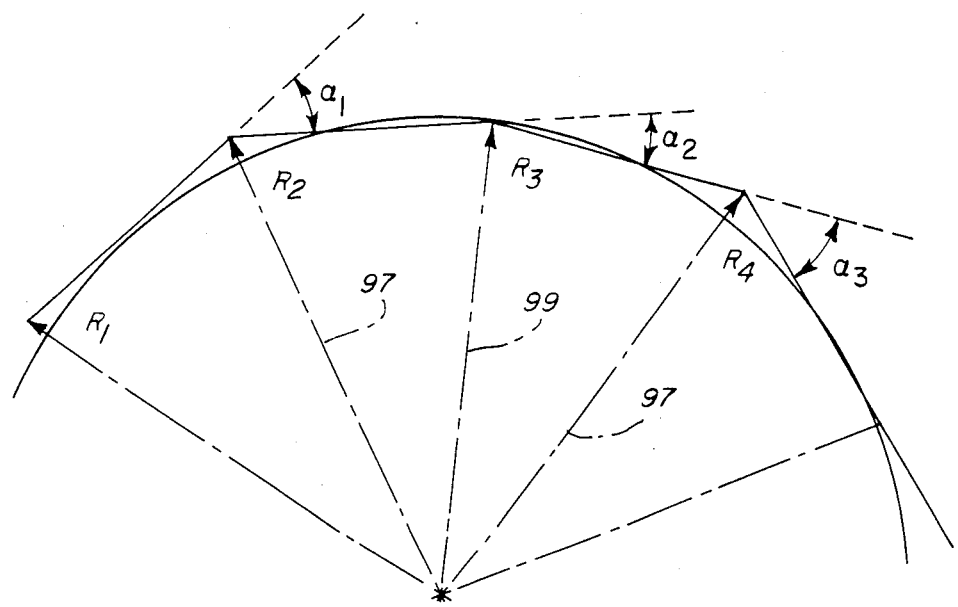
FIG. 15 is a schematic illustration which explains the theory of operation of this invention showing active pins and pin radii.

FIG. 15 illustrates how the link construction of this invention when assembled in a chain serves to randomize chordal action-induced cyclic effects by selectively changing the radius of the articulating, active pin. The pitch line—a line joining articulation axes—of a rigid link chain, such as the chain described herein for a drive pulley sprocket is polygonal rather than circular. This net effect is what is termed "chordal action" because there is a radial as well as a longitudinal component of motion as the chain encircles the pulley or sprocket.

The joint radius is selectively changed using the link of this invention. There are four possible joint radii, depending upon the orientation of the links. Two of these radii are identified with the reference characters 97 and 99 as seen in FIG. 15. In the system, it has been determined that the occurring cyclic noise pattern is changed and is more acceptable to humans.

FIG. 16 is a graph with the sound pressure level in decibels plotted against the speed ratio for both a straight pitch chain and the improved chain. The solid line represents the sound levels recorded for the improved chain showing the dependency of the noise level on the chordal action of the links and the broken lines represent the sound levels for a straight pitch chain using blocks with multiple windows and links of equal pitch joined by pins similar to those illustrated herein. The same equipment was used to test the chain-belt and to record the sound level for the chain-belt of this invention and the one described immediately above. When the two graphs are compared, it is obvious that the sound level in decibels produced by the chain-belt of this invention is less than that produced by the immediately described multiple-window block chain-belt. The range of sound pressure levels for the prior art chain-belt is from approximately 72.5 decibels to approximately 94 decibels whereas that for the chain-belt of this invention is from approximately 65 decibels to approximately 85 decibels. The reduction in sound levels for the chain-belt of this invention is readily apparent. Chains constructed according to this invention have been noise rated 7 and above on a 1 to 10 scale, with the more acceptable rating being higher numbers.

The improved chain for which the graph of FIG. 16 was made had 78 sets of links arranged as follows:

| SET | LINK ORIENTATION |
| --- | --- |
| 1 | 63D |
| 2 | 63B |
| 3 | 63A |
| 4 | 63C |
| 5 | 63D |
| 6 | 63B |
| 7 | 63A |
| 8 | 63C |

-continued

| SET | LINK ORIENTATION |
| --- | --- |
| 9 | 63D |
| 10 | 63B |
| 11 | 63A |
| 12 | 63C |
| 13 | 63D |
| 14 | 63B |
| 15 | 63A |
| 16 | 63C |
| 17 | 63A |
| 18 | 63C |
| 19 | 63A |
| 20 | 63C |
| 21 | 63A |
| 22 | 63C |
| 23 | 63D |
| 24 | 63B |
| 25 | 63D |
| 26 | 63B |
| 27 | 63D |
| 28 | 63B |
| 29 | 63D |
| 30 | 63B |
| 31 | 63A |
| 32 | 63C |
| 33 | 63A |
| 34 | 63C |
| 35 | 63A |
| 36 | 63C |
| 37 | 63A |
| 38 | 63C |
| 39 | 63A |
| 40–78 repeat of 1–39 | |

Figure 17:
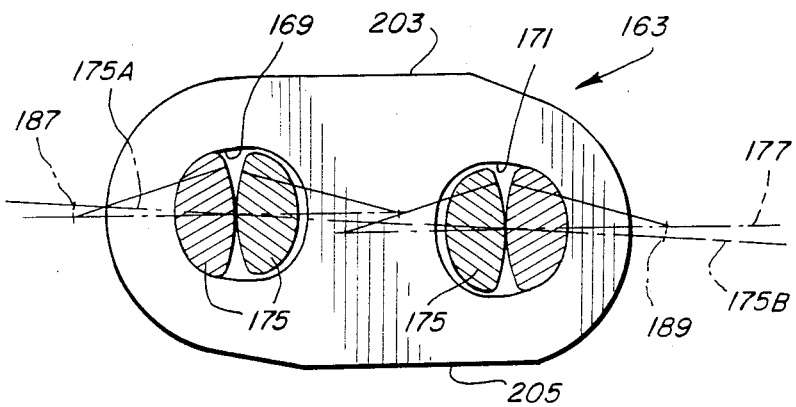

FIG. 17 of the drawings discloses an alternate form of chain link 163 similar to the link 63 having a pair of longitudinally spaced apertures 169 and 171 receiving suitable pivot means and adapted for interleaving in sets of links as previously described and permitting articulation of one set of links relative to an adjacent set. The pivot means comprises a pair of pins 175 having the same cross-section and opposite orientation. As in the previous embodiment, the articulation axes are perpendicular to the plane of the drawing.

At least one, and preferably both of the apertures 169 and 171 are laterally offset from the center line 177 for the link, and thus unequally spaced from reference line 195, and both apertures are rotated approximately 3° 16' in the same direction so that the lines 175A and 175B of aperture symmetry are again parallel to each other, although the apertures may be rotated by unequal angles. The outside shape and configuration of the link 163 is substantially identical to that of the link 63 seen in FIG. 8 with reference line 195 coinciding with the lower edge of the link. By rotating the apertures 169 and 171, the cross sections of the pivot members or pins 175 are also rotated to shift the centers of action 187 and 189 as shown relative to the reference line 195 so as to be unequally spaced therefrom. As the centers of action have been shifted, the line of pull through these centers is altered as is the pin loading to decrease wear on the links and pins. The operation of the chain-belt incorporating the links 163 is essentially the same to that described for the first embodiment.

Also, it can be seen that the link 163 has four possible orientations in the same manner as shown in FIGS. 9 to 12. Thus, the links in a chain-belt, depending on their orientation, will approach a pulley at different angles to the line of pull and at different joint radii relative to the pulley. The joint radius is selectively changed using the link 163, with four possible joint radii; two of which are larger and two of which are smaller than the joint radius of a straight pitch link.

In FIG. 18 of the drawings, a third embodiment of chain link 263 is shown wherein the link has a pair of longitudinally spaced and laterally offset apertures 269 and 271; one or both apertures being offset from the center line 277 of the link. However, in this embodiment, the apertures are rotated in opposite directions for approximately 3° 16', although unequal angles of rotation may be used. Thus, aperture 269 is rotated counterclockwise and aperture 271 is rotated clockwise. That orientation results in a shift of the centers of action 287 and 289 for the pins 275, or pin and rocker, relative to the reference line 295, but unequally spaced therefrom. This embodiment provides a line of pull 125 through the centers of action 287 and 289 and provides a top and a bottom orientation for the link; so that only two orientations of the link are practical from the standpoint of pin loading; i.e., the link can be rotated end-for-end about a vertical axis but not rotated about the horizontal longitudinal axis. Also, the lines of aperture symmetry 275A and 275B are not parallel but intersect in this link embodiment.

In the alternative, the aperture 269 of this link may be rotated clockwise and the aperture 271 rotated counterclockwise. This rotation will reverse the top and bottom orientation of the link from that shown in FIG. 18.

FIG. 19 relates to the utilization of the present invention with a chain link 363 of the toothed or toed type utilized with a sprocket or gear (not shown). This link includes an elongated body with a pair of longitudinally spaced apertures 369 and 371, and a pair of depending teeth or legs 378 and 379 defined by curved inner flanks 381 and 383 separated by a crotch 385 and outer flanks 391 and 393. A reference line 395 extends longitudinally through the teeth of the link, the line intersecting the outer surfaces 391, 393 of the teeth at equal angles θ; the apertures 369 and 371 being unequally vertically spaced from the reference line 395. The axes of articulation 375A and 375B of apertures 369 and 371, respectively, are parallel to the reference line and each other, and the centers of action 387 and 389 of the pairs of pins 375 are unequally spaced from reference line 395.

The apertures may only be translated as shown in FIG. 19, or the apertures may also be rotated both in the same direction or in opposite directions of rotation in a similar fashion to that shown in FIG. 17 or 18, with attendant shifting of the centers of action. It is believed that this chain link will also effect noise reduction as that for the drive chain discussed previously.

FIG. 20 illustrates a further embodiment of chain link 463 comprising an elongated link with longitudinally spaced apertures 469 and 471 on a longitudinally extending line 477 of the link parallel to the upper edge 473. However, rather than translation of the apertures, the lower edge or reference line 495 is oriented at a small angle to the upper edge 473 so that the edges converge toward the right hand side and the apertures are unequally spaced from the line 495. Engagement of this link and load block with a drive pulley, the link being capable of four possible orientations, overcomes the objectionable noise problem in the same general manner as the previous link embodiments.

Figure 21:
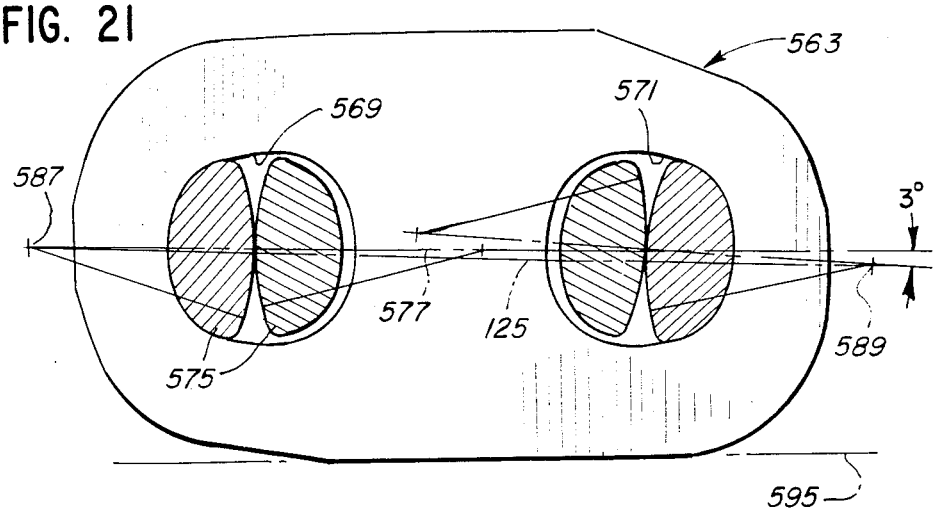
FIG. 21 is an elevational view of a sixth embodiment of chain link for the present invention.

Another embodiment of chain line 563 is shown in FIG. 21 wherein the link configuration is substantially as shown in FIG. 8, with the link having a pair of spaced symmetrical apertures 569 and 571 positioned on the longitudinal center line 577, with symmetrical pins 575,575 forming a pin and rocker arrangement. Rather than a vertical translation of the apertures to shift the centers of actions relative to the center line 577, the center of action 587 for opening 569 is located on the center line 577 while the aperture 571 and pins 575,575 are rotated in a clockwise direction for a small angle of approximately 3° to 4°. This rotation shifts the center of action 589 away from the center line to provide unequal spacing of the centers of action relative to the reference line 595. The line of pull 125 passes through the centers of action at an acute angle to the reference line 595 through the link.

Figure 22:
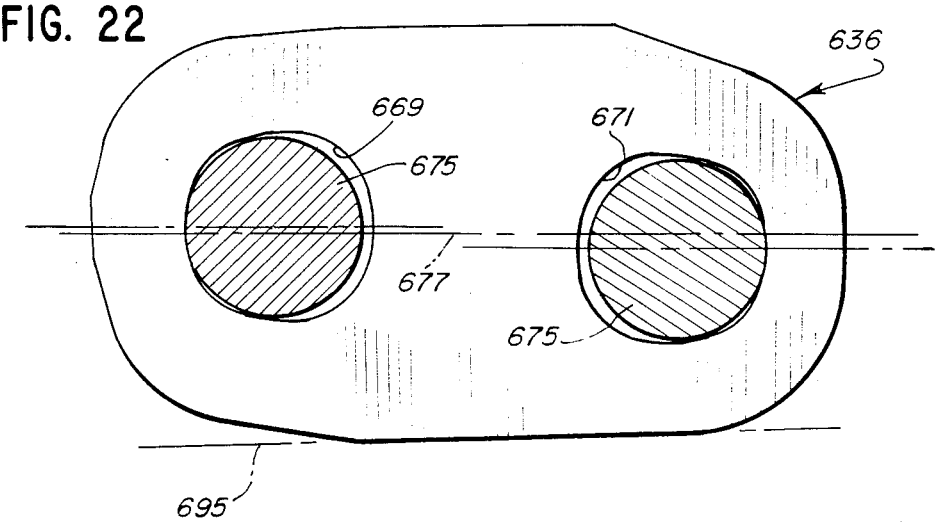
FIG. 22 is an elevational view of the link of FIG. 8 shown with a round pin.

The link 663 shown in FIG. 22 has the same general configuration as the link 63 shown in FIG. 8, except the longitudinally spaced apertures 669 and 671 are circular openings and the pins 675 are cylindrical pins extending through the apertures. At least one opening is vertically offset from the longitudinal center line 677 of the link, which results in the apertures being unequally spaced from the reference line 695 coinciding with the lower edge of the link. This link will also provide the randomization that will act to reduce the noise problem for the chain.

A chain-belt constructed of links such as those illustrated in FIGS. 8 to 12 or in FIG. 17, 18, 20 21 or 22 will include load blocks as illustrated in FIGS. 5, 6 and 7. Where the apertures in links 163, 263, 363 and 563 are rotated, it is apparent that the configuration of the aperture will be a non-circular symmetrical opening. The appended claims are intended to cover all reasonable equivalents of the claimed structure.

I claim:

1. A link for a power transmission chain, said link having a reference line generally parallel to the direction of link motion when assembled and operated in the power transmission chain, said link defining a pair of longitudinally spaced-apart apertures, and characterized in that said apertures provide centers of action that are unequally spaced from said reference line.

2. A link as recited in claim 1, and further characterized in that said reference line of the link comprises a longitudinal edge surface thereof.

3. A link as recited in claim 2, in which said link has oppositely disposed generally parallel longitudinal edge surfaces.

4. A link as recited in claim 2, and further characterized in that the link has an oppositely disposed edge surface, one of said edge surfaces defining an acute angle with respect to the other of said surfaces.

5. A link as recited in claim 1, and further characterized in that the link has an edge surface defining at least one tooth.

6. A link as recited in claim 1, in which the axes of symmetry of said apertures are parallel to said reference line.

7. A link as recited in claim 1, in which said axes of symmetry of said apertures both intersect said reference line.

8. A link as recited in claim 7, in which said axes of symmetry are generally parallel.

9. A link as recited in claim 1, in which at least one of said apertures is offset from the longitudinal centerline of the link.

10. A link as recited in claim 1, in which said apertures are oppositely offset from the longitudinal centerline of said link.

11. In a power transmission chain, the combination of a plurality of links each defining a pair of longitudinally spaced apertures and a longitudinal reference line, one of the apertures in each link being transversely aligned with an aperture in the next adjacent link to form transverse rows of aligned apertures, pivot means received in each row of transverse apertures, said pivot means defining spaced transverse articulation axes which are parallel to one another, the improvement comprising said apertures in at least one link having centers of action which are unequally spaced from said reference line.

12. A chain as recited in claim 11, in which the longitudinal spacing of the apertures of each link is the same.

13. A chain as recited in claim 11, in which each pivot means comprises a pair of pin members each having the same cross-section and being symmetrical about an axis bisecting said pin member.

14. A chain as recited in claim 13, wherein each pin member is defined by a plurality of surfaces, one of which is an arcuate rocking surface defined by a relatively large radius from said center of action and another of which is a back surface defined by progressively smaller radii outwardly in two directions from its axis of symmetry.

15. A chain as recited in claim 11, wherein at least one of said apertures is offset from the longitudinal center line for said link.

16. A chain as recited in claim 11, wherein said apertures are oppositely offset from the longitudinal center line of said link.

17. A chain as recited in claim 16, wherein said pivot means comprises a pair of pin members each having the same cross section, said apertures and pin members being symmetrical about an axis bisecting said pin members.

18. A chain as recited in claim 17, wherein the axes of symmetry of said apertures and pin members are generally parallel to the longitudinal center line of said link.

19. A chain as recited in claim 17, wherein the axes of symmetry of said apertures and pin members are rotated in the same direction through a small angle relative to the longitudinal center line of the link.

20. A chain as recited in claim 17, wherein the axes of symmetry of said apertures and pin members are rotated in opposite directions through a small angle relative to the longitudinal center line of the link.

21. A chain as recited in claim 11, wherein said apertures are located on a longitudinal line extending through the link parallel to one longitudinal edge of the link, the opposite edge of the link being non-parallel to the longitudinal line for said apertures.

22. A chain as recited in claim 11, wherein said pivot means comprises a pair of pin members each having the same cross section, said apertures and pin members being symmetrical about an axis bisecting said pin members, the axis of symmetry of one aperture and pin members therein being rotated through a small angle relative to the longitudinal center line for the link.

23. A power transmission chain including a plurality of links of constant pitch and adapted to engage a driving means so as to transfer torque thereto, said chain having a plurality of serially arranged contact surfaces and said driving means having contact surfaces, said chain contact surfaces being regular and so constructed and arranged to engage said driving means contact surfaces to provide the transfer of torque, the improvement comprising varying the joint radii of at least some of said chain links with respect to the driving means and thereby changing the contact timing and duration therebetween to alter the noise pattern generated by the chain with the driving means.

24. A power transmission chain as recited in claim 23, and further characterized in that the link has a reference line, and spaced apertures providing centers of action that are unequally spaced from said reference line.

25. A power transmission chain as recited in claim 24, and further characterized in that said reference line of the link comprises a longitudinal edge surface thereof.

26. A power transmission chain as recited in claim 25, in which said link has oppositely disposed generally parallel longitudinal edge surfaces.

27. A power transmission chain as recited in claim 25, and further characterized in that the link has an edge surface defining at least one tooth.

28. A power transmission chain as recited in claim 24, including load blocks of substantially constant width encircling said links, and said driving means comprises a pulley having flanges contacted by said load blocks.

29. A chain-belt adapted to interconnect the pulleys of a pulley transmission, the pulleys of which are each constructed of a pair of flanges, said chain-belt comprising a plurality of connected sets of transversely aligned, constant pitch links forming a closed loop, each link defining longitudinally spaced apertures and a longitudinal reference line, the apertures in a set of links being transversely aligned to form rows of apertures, one row of apertures being transversely aligned with a row of apertures in the next adjacent set of links, pivot means received in each transversely aligned row of apertures, each pivot means defining a transverse articulation axis, each transverse articulation axis being parallel to the other articulation axes, said pivot means having centers of action which are, in at least one set of links, unequally spaced from a plane formed from said reference lines of said link set, and a constant width load block encircling each set of links for engaging the pulley flanges of the transmission.

30. A chain-belt as recited in claim 29, in which each pivot means of a set of links has a plane of symmetry and the planes of symmetry of least one set of links in said chain-belt are parallel to said reference plane.

31. A chain-belt as recited in claim 29, in which each pivot means of a set of links has a plane of symmetry and the plane of symmetry of at least one set of links in said chain-belt defines an acute angle with the plane of symmetry of the other pivot means in said at least one set of links.

32. A chain-belt as recited in claim 29, in which said pivot means comprises a pair of pin members each having the same cross-section and being symmetrical about an axis bisecting each pin member.

33. A chain-belt as recited in claim 32, wherein each pin member is defined by a plurality of surfaces, one of which is an arcuate rocking surface defined by a relatively large radius from said center of action and another of which is a back surface composed of surface areas defined by small radii.

34. A chain-belt as recited in claim 29, wherein each link of each set is alike in shape.

35. A chain comprising a plurality of links of one configuration with generally parallel edge defining surfaces joined together to form a continuous loop, said links each defining a pair of longitudinally spaced apertures, one aperture of which is transversely aligned with one of the apertures in the next adjacent link, pivot means in each aligned aperture, said pivot means each defining an articulation axis about which the next adjacent links can pivot and having a center of action, the improvement wherein a line of pull is defined by a line joining each successive center of action, said edge surfaces of at least some of said links defining acute angles with said line of pull.

36. A chain as recited in claim 35, further comprising a load block encircling each link and located between successive pivot means, each load block being generally perpendicular to at least one edge surface of the encircled link.

37. In a drive system having a pair of spaced-apart pulleys, an articulated drive chain intercoupling the pulleys, the drive chain comprising a plurality of constant pitch links, each link defining at least two spaced-apart apertures, and pivot means extending through aligned apertures of adjacent links to form an endless, articulated drive chain, each pulley having a center of rotation, wherein a given link making initial contact with one of the pulleys is termed an active link, and the pivot means extending through that aperture of the active link farther from the one pulley is termed an active pivot member, the improvement comprising modifying the configuration of at least some link-pivot means combinations in a non-uniform manner to vary the radial distance from a pulley center of rotation to the active pivot means center as successive links contact the pulley, to reduce the objectionable noise as the system is driven.

38. The combination of a chain and driving means having a center, said chain establishing a force relationship with said driving means when driving the latter, said chain being an endless loop and constructed of a plurality of sets of transverse, constant pitch links, the adjacent sets of which are interconnected by transverse pivot means each defining an articulation axis, and a torque arm defined between the center of said driving means and each articulation axis as a set of links with which the articulation axis is associated enters a driving relationship with said driving means, each torque arm having a length, the improvement comprising randomizing the lengths of successive torque arms, thus randomizing the force relationship between said chain and said driving means whereby a noise pattern resulting from the chain when driving the driving means is modified.

* * * * *